United States Patent
Gefen

(10) Patent No.: US 8,731,239 B2
(45) Date of Patent: May 20, 2014

(54) SYSTEMS AND METHODS FOR TRACKING OBJECTS UNDER OCCLUSION

(75) Inventor: Smadar Gefen, Yardley, PA (US)

(73) Assignee: Disney Enterprises, Inc., Burbank, CA (US)

( * ) Notice: Subject to any disclaimer, the term of this patent is extended or adjusted under 35 U.S.C. 154(b) by 424 days.

(21) Appl. No.: 12/833,541

(22) Filed: Jul. 9, 2010

(65) Prior Publication Data

US 2011/0135149 A1    Jun. 9, 2011

Related U.S. Application Data

(60) Provisional application No. 61/285,099, filed on Dec. 9, 2009.

(51) Int. Cl.
*G06K 9/00*    (2006.01)
*G01S 3/786*    (2006.01)
*G01S 5/02*    (2010.01)

(52) U.S. Cl.
CPC ............. *G01S 3/7864* (2013.01); *G01S 5/0257* (2013.01); *G06T 2207/30221* (2013.01); *G06T 2207/30228* (2013.01); *G06T 2207/30241* (2013.01); *G06T 2207/10016* (2013.01)
USPC ............................. 382/103; 348/143; 348/169

(58) Field of Classification Search
CPC ........... G06T 2207/10016; G06T 2207/30221; G06T 2207/30228; G06T 2207/30241; G01S 3/7864; G01S 5/0257
USPC ................................... 382/103; 348/143, 169
See application file for complete search history.

(56) References Cited

U.S. PATENT DOCUMENTS 3,864,662 A * 2/1975 David et al. ..................... 367/6
(Continued)

FOREIGN PATENT DOCUMENTS

WO    2006/026515    3/2006
WO    WO 2010/036456    4/2010

OTHER PUBLICATIONS

Hontani et al., "A Visual Tracking aystem using an RFID-Tag", SICE 2004 Annual Conference, vol. 3, 2720-2723.*

(Continued)

*Primary Examiner* — Daniel Mariam
*Assistant Examiner* — Katrina Fujita
(74) *Attorney, Agent, or Firm* — Fay Kaplun & Marcin, LLP

(57) ABSTRACT

A method for tracking objects in a scene may include receiving visual-based information of the scene with a vision-based tracking system and telemetry-based information of the scene with a RTLS-based tracking system. The method may also include determining a location and identity of a first object in the scene using a combination of the visual-based information and the telemetry-based information. Another method for tracking objects in a scene may include detecting a location and identity of a first object and determining a telemetry-based measurement between the first object and a second object using a real time locating system (RTLS)-based tracking system. The method may further include determining a location and identity of the second object based on the detected location of the first object and the determined measurement. A system for tracking objects in a scene may include visual-based and telemetry-based information receivers and an object tracker.

28 Claims, 12 Drawing Sheets

(56) References Cited

U.S. PATENT DOCUMENTS

| | | | |
|---|---|---|---|
| 6,674,877 B1* | 1/2004 | Jojic et al. | 382/103 |
| 6,998,987 B2* | 2/2006 | Lin | 340/573.1 |
| 7,154,396 B2 | 12/2006 | Reunamaki | |
| 7,432,802 B2* | 10/2008 | Charlot et al. | 340/505 |
| 7,787,886 B2* | 8/2010 | Markhovsky et al. | 455/456.1 |
| 7,822,424 B2* | 10/2010 | Markhovsky et al. | 455/456.1 |
| 2004/0105006 A1 | 6/2004 | Lazo | |
| 2005/0117033 A1* | 6/2005 | Matsui | 348/239 |
| 2006/0028552 A1* | 2/2006 | Aggarwal et al. | 348/169 |
| 2006/0279630 A1* | 12/2006 | Aggarwal et al. | 348/143 |

OTHER PUBLICATIONS

Cerrada et al., "Improved Method for Object Recognition in Complex Scenes by Fusioning 3-D Information and RFID Technology", Oct. 2009, IEEE Transactions on Instrumentation and Measurement, vol. 58, No. 10, 3473-3480.*

Hontani et al."A visual tracking system using an RFID-tag", Aug. 4, 2004, vol. 3, 4, pp. 2720-2723, XP010824913,SICE Annual Conference in Sapporo, Aug. 4-6, Hokkaido Institute of Technology, Japan.

RFID in Japan: "NEC developed system that combines rfid and surveillance camera", Jun. 21, 2006, http://rfidinjapn.wordpress.com, 1 page.

* cited by examiner

SYSTEMS AND METHODS FOR TRACKING OBJECTS UNDER OCCLUSION

CROSS REFERENCE TO RELATED APPLICATIONS

This application claims the benefit of U.S. Provisional Appl. No. 61/285,099, filed Dec. 9, 2009, which is hereby incorporated by reference in its entirety.

FIELD OF INVENTION

Embodiments of the present invention relate to computer vision, image processing, and Real Time Locating Systems (RTLS).

BACKGROUND

Computer vision based methods for tracking multiple objects rely on the distinctive appearance and known motion models of objects to continuously locate and identify them in the scene. Generally, the fidelity of positional data generated by vision-based methods is high. However, when the objects being tracked move in clusters, it complicates the tracking process. Numerous techniques address the challenge of tracking objects undergoing occlusion. Such algorithms that attempt to resolve this problem are usually successful, providing the objects possess distinctive appearances and their motion is consistent. Nevertheless, in practice, objects may have similar appearances and their motion under occlusion may be unpredictable. Such situations occur in a team game (football, basketball, etc.) where players tend to huddle in clusters.

An alternative to vision-based tracking systems is to use RTLS technology. An RTLS is a locating technology designed to detect and track people as well as assets. It includes transponders (transmitter/responder components) attached to dynamic objects, portable or stationary readers (transceivers-transmitter/receiver-components), and a server application. An RTLS methodology spans various technologies including infrared, sound, ultrasound, Wi-Fi, radio frequency identification (RFID), Ultra Wideband, GPS, and Cellular. Each technology is better suited for a certain application depending on parameters such as power requirements, range, indoor versus outdoor applicability, spatial accuracy (granularity), latency, and data rate.

Essential to the RTLS is the transponder (tag) characteristic. Objects under tracking may be tagged by passive, semi-passive, or active tags. A passive transponder does not have a battery and, therefore, does not initiate a communication. It is empowered by the received signal and responds by reflecting this signal using a technique termed backscatter. The reflected signal is modulated with data stored in the tag's memory. The range of a passive tag (up to 100 meters) is a function of the reader's signal strength and the tag's antenna. It is physically small and light, without any processing capability, and, therefore, inexpensive. Just like passive transponders, semi-passive transponders do not initiate communication but use a backscatter technique to respond to the received signal. Nevertheless, they do have their own battery (up to a 10 year lifetime) which is used mainly to power environmental sensors, measuring temperature or motion, for example, or to increase operation range. Operational range and size are comparable to those of a passive transponder. On the other hand, active transponders are equipped with a battery (up to a 5 year lifetime) which is used to power their circuitry and generate transmission signals. Hence, active transponders can initiate communication periodically or when triggered by an attached sensor. However, frequent transmissions consume more energy and shorten battery life. Depending on the type of battery, an active transponder is physically larger than a passive transponder, its range can reach up to several hundred meters, and its processing capability is better as it may contain a computer chip.

Although RTLS is a promising and an emerging technology, it suffers from physical difficulties, including multipath fading, signal attenuation, limited data rate, latency, and, most importantly, the need to have multiple lines of sight (LOS). In some applications, an RTLS is required to identify and locate objects with high accuracy and precision. For example, in tracking players in a team game, the positional data of the players during live game broadcast is instrumental for real time annotation (telestration) and for computing the players' performance statistics. Since most of the time the players move around quickly and in close proximity to each other, meaningful tracking performance should be within an accuracy of less than one foot.

What is needed are improved methods for utilizing vision based technology and RTLS technology to track players in a game that are occluded or in a cluster.

BRIEF DESCRIPTION OF DRAWINGS

Embodiments of the invention are described with reference to the accompanying drawings. In the drawings, like reference numbers may indicate identical or functionally similar elements. The drawing in which an element first appears is indicated by the left-most digit in the corresponding reference number.

DETAILED DESCRIPTION

Figure 1A:
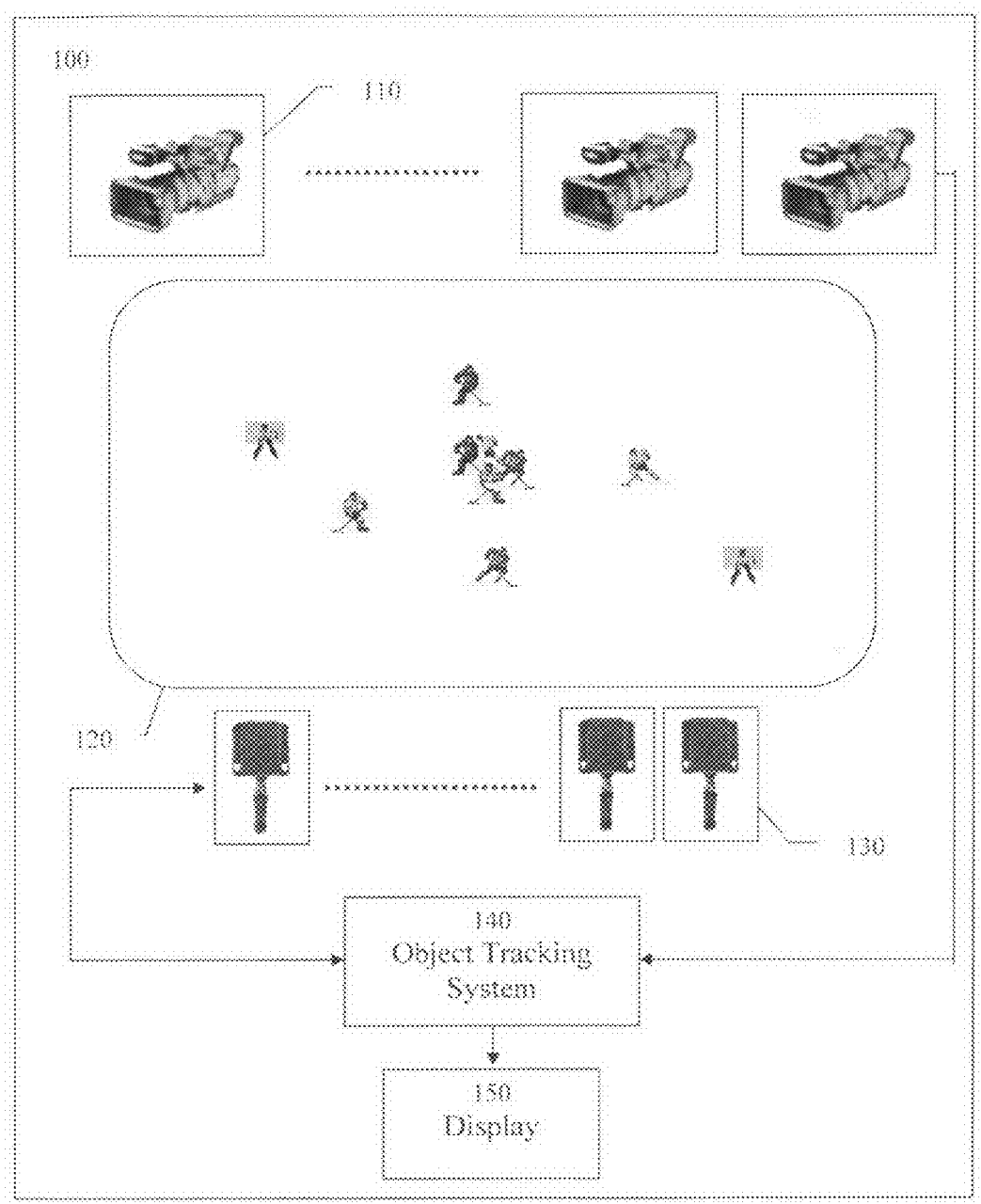
FIGS. 1A-1B show top level block diagrams of a proposed synergetic tracking system according to an embodiment.

Methods and systems for tracking objects during an event are provided. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein relate to utilizing RTLS technology in combination with vision-based technology to track and identify multiple objects in real time. Embodiments may also relate to a system in which an RTLS and vision-based technologies are combined to increase the fidelity of the overall tracking system. Further embodiments may describe a method to maintain continuous tracking and identification of multiple objects, possibly with similar appearances and undergoing persistent occlusion, using only one camera and one reader.

The tracking systems and methods described in embodiments of the present invention are described below in the context of tracking players, referees, support people, and related objects (puck, ball, etc.) in a team game. A person of skill in the art will appreciate that the system and methods of this invention may be applied to a wide range of events including, but not limited to, any sporting event, as well as to non-sporting applications that require tracking and/or identifying one or more objects in a scene.

Both a vision-based tracking system and an RTLS-based tracking system when used independently encompass technological limitations that stand in the way of achieving object positioning with acceptable performance. Aspects of this invention devise methods where undetermined tracking results provided by each technology independently are fused into a complete tracking solution.

Current state of the art RTLS allows for identification and localization of in-range dynamic objects with accuracy between 0.3 and 3 meters. Nevertheless, at the presence of phenomena such as multipath fading, attenuation, occlusion, etc., the positional data is not deterministic but, rather, carries a spatial uncertainty region represented by a Probability Density Function (PDF). Depending on the number of lines of sight (LOS) available, this PDF may span within a small neighborhood of the object's location or may span throughout a wider region. Used alone, an RTLS-based tracking system may not be able to provide a full solution.

Vision based systems may include those described in U.S. patent application Ser. No. 12/403,857 by Gefen, incorporated by reference herein in its entirety. One challenge of vision-based systems includes resolving the identity of the objects being tracked when their appearances are similar. This problem may be especially acute when objects split out of a cluster. One aspect of an embodiment of this invention combines vision-based accurate object positional data with RTLS-based object identification data to re-label objects as they are occluded or split out of a cluster.

Another challenge is tracking and accurately positioning objects within a cluster, especially when objects move randomly in close proximity. According to some embodiments, the position of objects that are occluded relative to the camera and the reader is resolved as follows. A vision-based tracking system detects isolated objects (objects that are not in close proximity to each other) in relative high fidelity. Hence, when an isolated object can "see" an occluded object (have an LOS to it) the distance between them can be measured. In such a configuration, transponders attached to the objects in the scene continuously send to the reader and to each other signals. These signals carry telemetry that is later processed to derive the distances between the reader and the transponders as well as the distances between the transponders themselves. In this embodiment, at least one camera and at least one reader utilize existing LOS between isolated objects and occluded objects in the scene to position these occluded objects that otherwise would be invisible.

In some cases, the location of tagged objects may be derived based on ranging techniques and based on position estimation techniques. Ranging techniques use telemetry, such as Time of Arrival (TOA), to derive the distances between readers and transponders. TOA is the time it takes a signal to travel from a reader to a transponder and/or a transponder to a reader. Given the signal propagation speed, the distance can be computed. Note that to achieve meaningful distance estimates, the transponder and the reader should be accurately synchronized. Another known telemetry is Angle of Arrival (AOA). AOA is the angle between the signal propagation direction and a reference axis. AOA requires directional (array) antenna and its accuracy is highly range-dependent (for a large range, a small error in the angle measurement results in a large error in position estimation). Received Signal Strength Indicator (RSSI) is yet another common telemetry. It measures the attenuation of the received signal to derive the distance. However, the attenuation may be affected by factors including multipath fading, temperature, humidity, and occluding objects. Other telemetries are known in the art include Time Difference of Arrival (TDOA), Time of Flight (TOF), and Round Trip Time (RTT). The accuracy of distances computed based on these telemetries is limited by the level of the technology (clocks and synchronization resolution or array antenna precision) and the conditions in the scene (humidity or obstacles).

Position estimation techniques may include trilateration and triangulation. In a three-dimensional case, a trilateration technique estimates the coordinates of a point A in space using at least 1) four given points in space with known coordinates and 2) the distances between these four points to point A. Note that these given four distances define spheres centered at the four given points, and that their intersection uniquely defines the point A. Similarly, a triangulation technique estimates the coordinates of point A in space using at least 1) three given points in space with known coordinates and 2) the angle between a line connecting these points and point A to a reference line. Note that these three given angles define cones centered at the three given points, and that their intersection uniquely defines point A. Hence, in the general case, a trilateration positioning technique requires at least four line-of-sights (LOS) between a transmitter and a receiver and a very accurate clock and synchronization system. While a triangulation positioning technique requires at least three LOS and a directional antenna with enough array elements to satisfy the required angular resolution. If more than the minimum required LOS is available, a least squares error estimation method may be applied to minimize position estimation error.

An exemplary synergetic system 100 for object tracking, such as tracking multiple objects, is shown in FIG. 1A, according to an embodiment. One or more cameras 110 are used to cover a dynamic scene 120 of multiple objects that are moving swiftly about each other, often in clusters. Note that these objects may have similar appearances—particularly in a team game where objects belong to the same team (offense, defense, or referees) exhibit similar appearance (team uniforms). In some embodiments, cameras may be statically positioned to cover the scene or may be dynamically translated and steered to cover the center of activity. In addition to the cameras, one or more readers may be positioned at the scene 130. Similarly to the cameras, the readers' locations may be static or dynamic to allow good reception of transmission signals from the transponders (tagged-objects). The video signals and telemetry from the readers may be fed into the object tracking system 140. According to an embodiment, object tracking system 140 may utilize vision-based techniques to continuously locate the objects in the scene, including the portable readers in view. Furthermore, according to some embodiments, RTLS technology may be utilized to resolve tracking under occlusion, as will be explained in detail below. The raw positional data generated by system 140 may be locally processed or sent to a third party for further processing. A GUI application 150 may include system control functionality, data visualization and the display of statistics that may be made available to an operator.

Both vision-based locating and RTLS-based locating may require lines of sight (LOS) to the object, according to some embodiments. While in the case of video it is possible to accurately locate and outline an object through processing applied to pixels coming from the object's image segment, RTLS may require more than one LOS to locate a tagged-object. In an unconstrained three-dimensional case, three LOS are required when using a triangulation positioning technique and four LOS when using a trilateration positioning technique. In the presence of 1) fewer LOS due to occlusion or signal reception failure, or 2) inherent error in the telemetry data, location of a tagged-object may come with an uncertainty region represented by a spatial likelihood function—Probability Density Function (PDF)—and formulated in either world-space or image-space coordinates. This PDF may be used as prior information in a probabilistic scheme for object tracking, such as a common particle filtering tracking method.

Figure 1B:
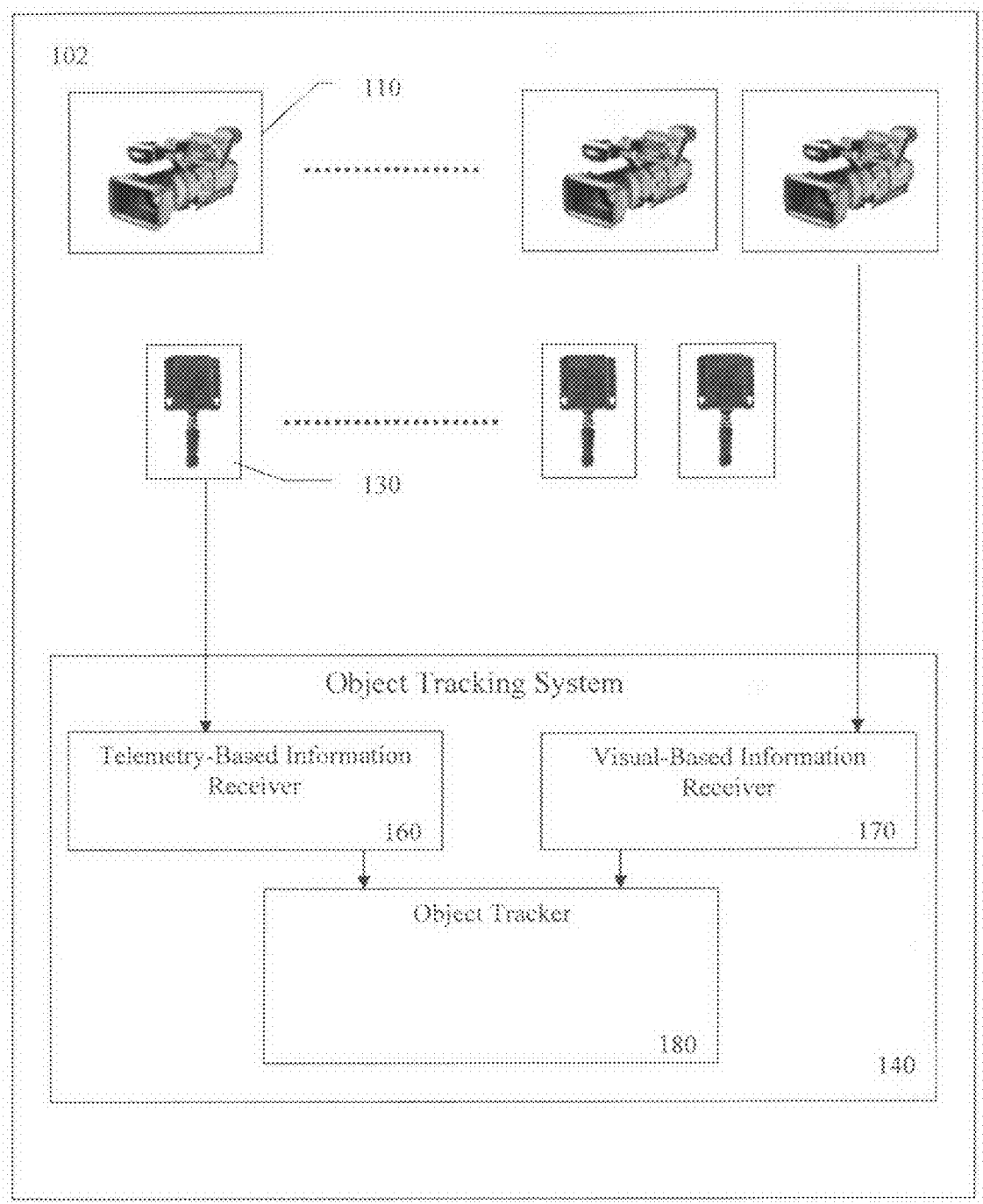

FIG. 1B illustrates a further embodiment 102 of an object tracking system. In this case, the object tracking system 140 may include a visual-based information receiver 170 to receive visual information, such as video signals or pixel data, collected by a vision system 110. Such a system may include one or more cameras surrounding the scene. The object tracking system 140 may also include a telemetry-based information receiver 160 to receive telemetry-based information, such as TOA or AOA data, from an RTLS's reader 130. The object tracker 180 may be configured to use the visual-based information and the telemetry-based information to locate and identify an object in the scene. Whenever visual-based information is unable to locate and identify the object in the scene, the object tracker 180 may use telemetry-based information measured from one or more objects in the scene to locate and identify the object. Whenever telemetry-based information is unable to locate and identify the object in the scene, the object tracker 180 may use visual-based information of the object to locate and identify it. Moreover, the combination of telemetry-based information and visual-based information may be used to uniquely determine the location and identity of an object when neither telemetry-based information nor visual-based information, when used independently, are sufficient to uniquely determine the location and identity of the object. This may be performed for multiple objects in an event or scene. The system 102 may accurately locate and identify multiple objects, including objects that are occluded, recently occluded, or in close proximity to other objects in a cluster.

Exemplary systems 100 and 102 or any part of systems 100 and 102 may be a part of or may be executed by one or more computing devices. A computing device can be any type of computing device having one or more processors. For example, a computing device can be a workstation, mobile device (e.g., a mobile phone, personal digital assistant, or laptop), computer, server, compute cluster, server game console, set-top box, kiosk, embedded system or any other device having at least one processor and memory. Embodiments of the present invention may be software executed by a processor, firmware, hardware or any combination thereof in a computing device. According to a further embodiment, the object tracking system 140 may be implemented in various locations of the video distribution path.

Figure 2:
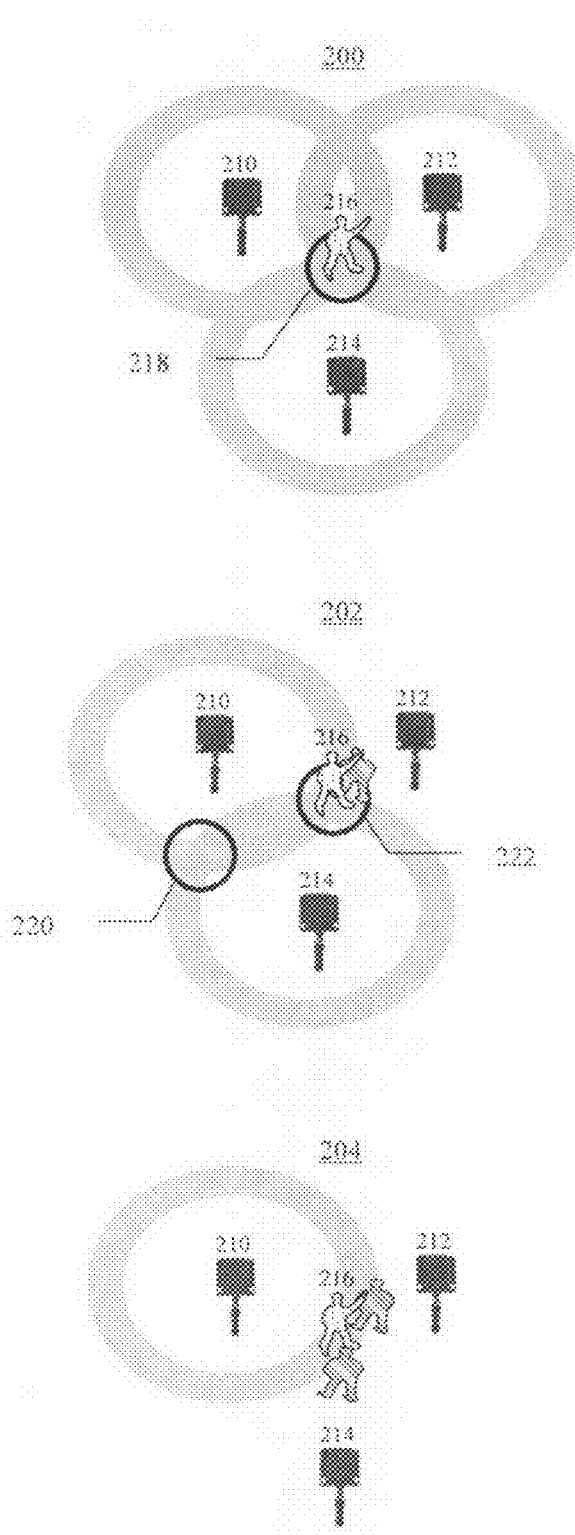
FIG. 2 shows a diagram of a trilateration positioning method in the two-dimensional case according to an embodiment.

FIG. 2 demonstrates three scenarios for RTLS-based localization in the two-dimensional case, according to embodiments of the invention. In each scenario there are three readers (or transponders attached to players), 210, 212, and 214, within the range of one transponder attached to one player 216. In the first case 200, all three readers have an LOS to the transponder. Therefore, three measurements of distance between the transponder and each reader are available. Based on these distances, a trilateration technique will result in an estimate for the location of player 216. This location estimate is represented by a PDF centered at the intersection of three spatial rings 218. The extent of such an uncertainty region (or standard deviation of the PDF) may be in the order of magnitude of few feet, depending on the accuracy and precision of the specific RTLS system technology.

In the second case 202, a tagged-player 216 is occluded by another player. As a result, only two readers, 210 and 214, have an LOS to the transponder, so only two measurements of distance are available. Hence, one can expect the player to be in one of two intersecting regions, 220 or 222. In the third case 204, a tagged-player 216 is occluded by two other players. As a result, only one reader, 210, has an LOS to the transponder so that only one distance measurement is available. Based on this distance measurement, the player can be expected to be anywhere along a spatial ring centered at the reader location. (The ring width corresponds to the inherent error in the given telemetry.) This spatial uncertainty regarding the whereabouts of a player can be resolved by fusing RTLS-based and vision-based tracking information according to embodiments of this invention.

Figure 3:
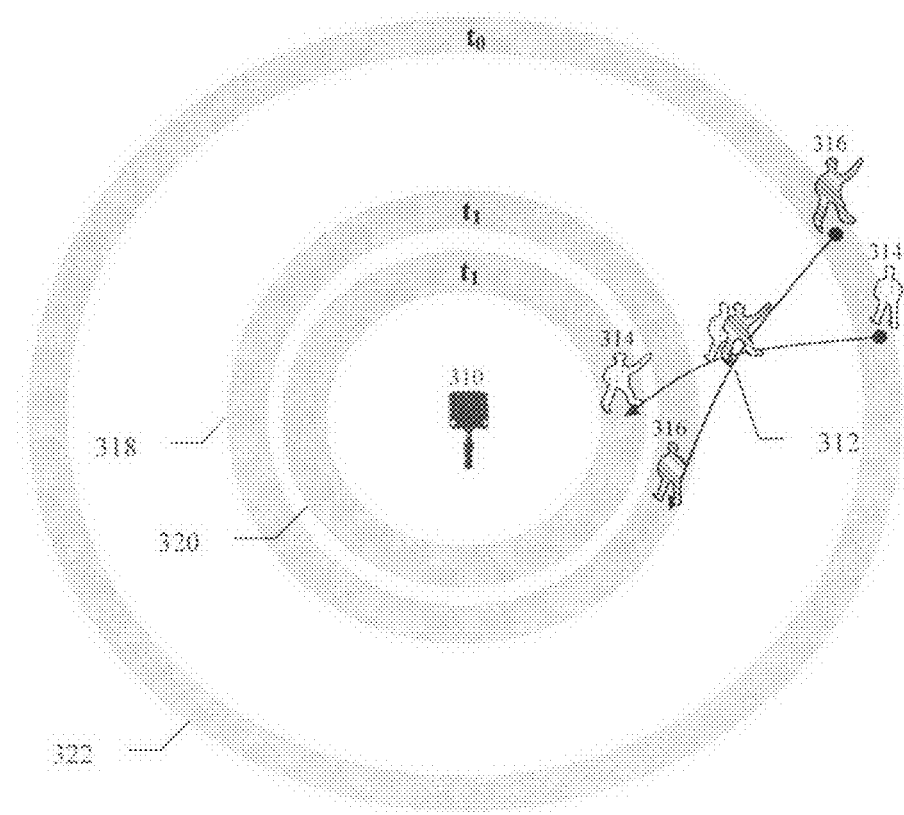
FIG. 3 shows a diagram that demonstrates using one line of sight (LOS) to resolve error in objects identification according to an embodiment.

A method according to an embodiment of this invention may determine the identity of objects undergoing occlusion. For example, FIG. 3 shows how common object identification error may be resolved by supplementing a vision-based tracking method with RTLS including one reader. Assuming player 314 and player 316 belong to same team, pattern recognition based techniques will be limited because of the overall similar appearance of the two players. Assuming also that at time $t_0$ both players start moving on a path where they are both correctly tracked and labeled by the tracking system along ring 322, then as they cross each other's path at cluster 312, their projected images will merge and then split at time $t_1$. Often, after splitting, vision-based methods may provide the players' exact positions, but their identity may be incorrectly swapped due to the two players' similar appearance. On the other hand, an RTLS's reader 310 provides the likely positions of the two players along the rings 318 and 320 together with their identities. Fusing the vision-based data (players' exact locations) with the telemetry-based data (players' identities), the object tracking system 140 may resolve the location and identity of each player after the split.

Figure 4:
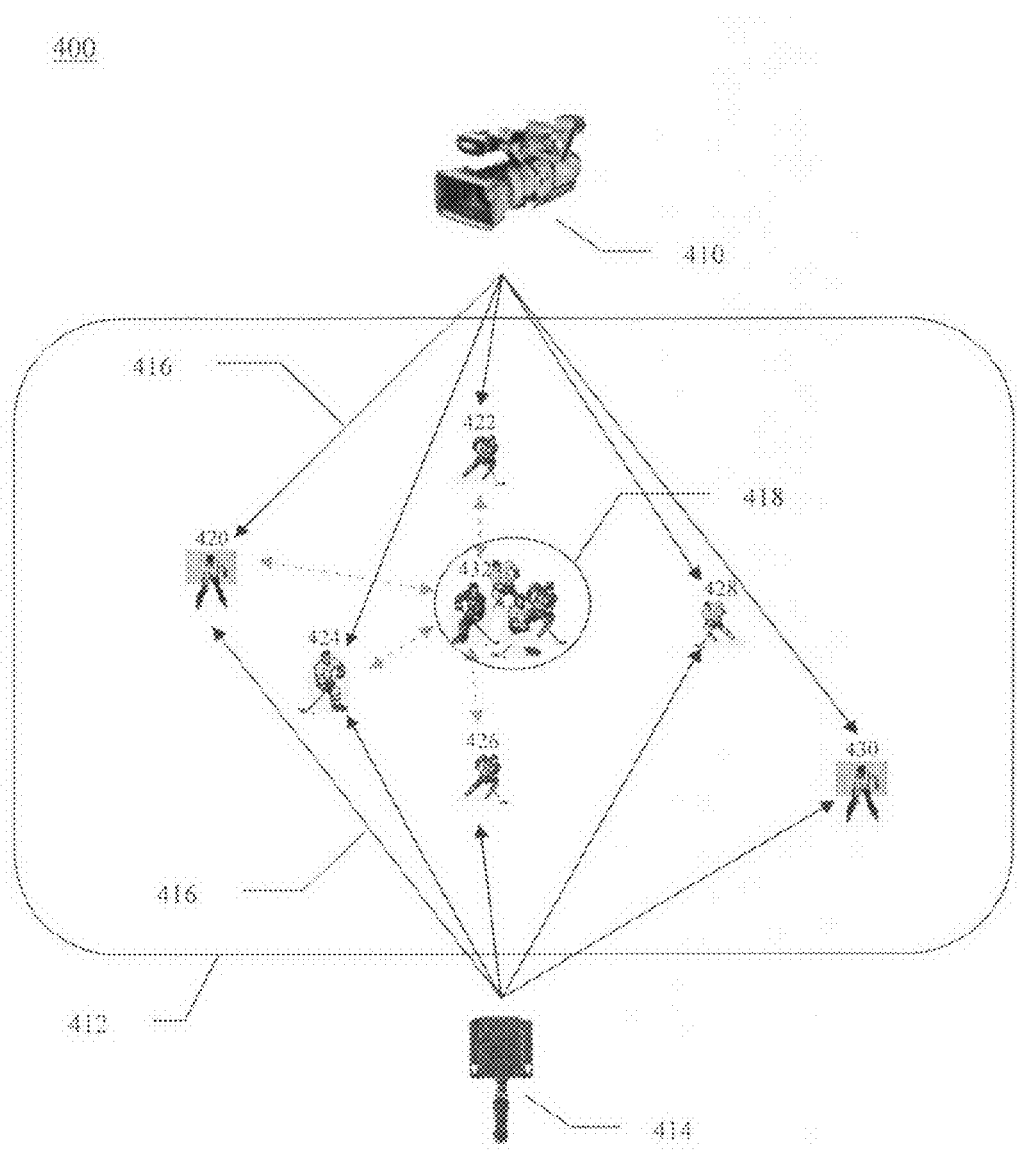
FIG. 4 illustrates positioning of occluded objects in a cluster according to an embodiment.

Another aspect of this invention allows for locating and identifying objects when they are occluded relative to the camera and the reader, as demonstrated in FIG. 4. In this example embodiment, one camera 410 and one reader 414 cover the scene 412. Typically, the scene includes players that move in relative far proximity from each other 420-430. These players are separable and can be located accurately by a vision-based tracking method. The challenge lies in accurately locating players that are positioned in a cluster 418, and, therefore, are occluding each other relative to the camera 410 and the reader 414. As depicted in FIG. 4, the camera and the reader have LOS 416 to players 420-430, and, as a result, the position and identity of these players is known. On the other hand, player 432 may be occluded by other players in the cluster 418 and therefore his projected image may be inseparable from the projected image of the entire cluster and therefore unrecognizable. Nevertheless, there is an LOS between this player 432 and players 420-426. Since the positions of these players are known (either by vision-or RTLS-based methods), the position of the occluded player 432 may be restored using a trilateration technique, for example. Note that in this setting each transponder (the tag attached to each player) is configured to transmit to the reader telemetry (such as TOA) related to both 1) the distance between this transponder and the reader and 2) the distance between this transponder and the other transponders within LOS of it. In a case where a transponder does not have an LOS to the reader, it may transmit its data to the reader via other transponder.

In such a multiple-access communication system, transponders' and readers' signals may collide and may cancel each other out, leading to an ineffective utilization of the bandwidth due to the need to repeat transmissions. Known anti-collision algorithms may be used, according to embodiments, and are designed to coordinate these simultaneous communications via multiaccess protocols so that the total time for identification as well as transponders power consumption are minimized. Communication signal arbitration techniques are already commonly used for news satellites and mobile telephone networks. Procedures such as: space division multiple access (SDMA), frequency domain multiple access (FDMA), time domain multiple access (TDMA), and code division multiple access (CDMA) are known in the art for dealing with transceiver-to-transceiver interference.

Figure 5:
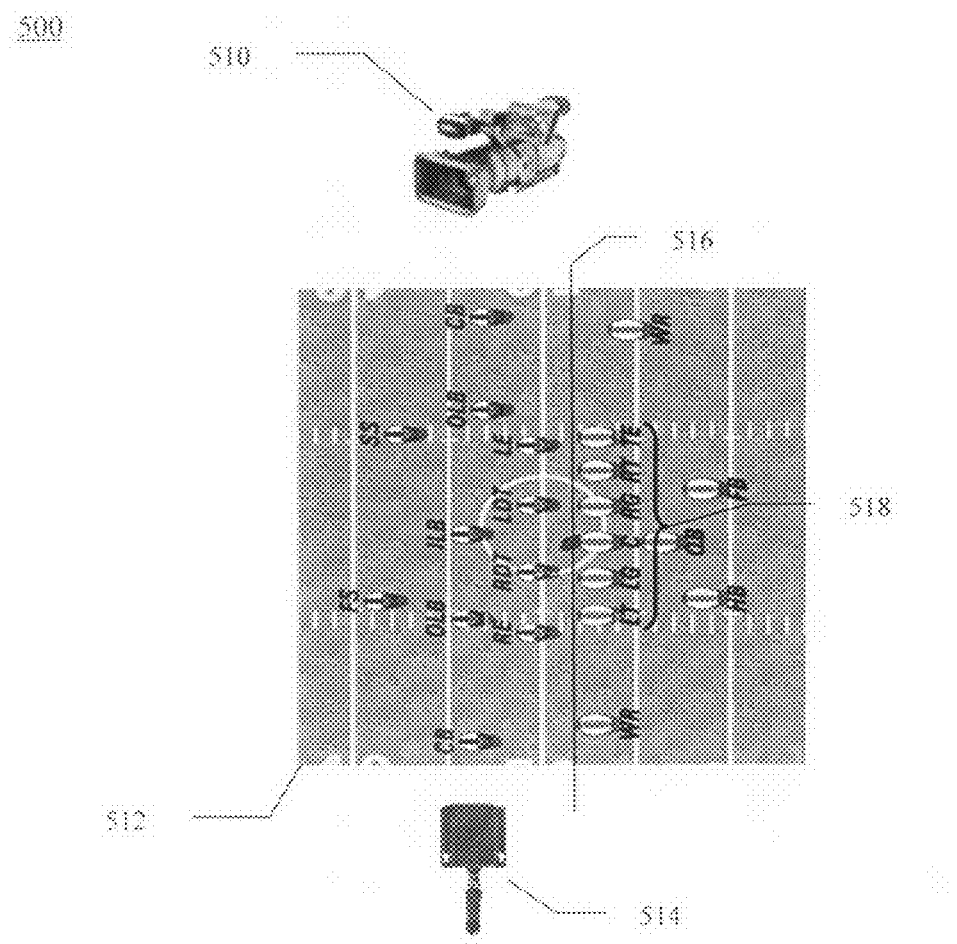
FIG. 5 illustrates positioning of occluded objects in a football game according to an embodiment.

Embodiments of this invention may be applied to the identification and tracking of a football game, as shown in FIG. 5. A football game is a uniquely challenging scene to analyze. It consists of short segments (plays), starting with both offense and defense players positioned in a certain formation. Upon play start, the offense team's objective is to advance the ball toward the end zone, while the defense team's objective is to oppose this advance. During this short duration of a play (several seconds) the players are moving quickly, huddling, and physically blocking each other. In this case, it is desired to be able to identify and locate the players as they position themselves into a formation along the scrimmage line (or as they position themselves for a kickoff), and to maintain tracking throughout the duration of the play.

According to an embodiment, this may be applied with a system comprising a camera 510 and a reader 514 (each positioned at any advantageous vintage point), transponders attached to the football players or some of the football players, and possibly transponders attached to referees or any support people in the vicinity. For example, similarly to the scenario demonstrated in FIG. 4, the Quarter-Back (QB) player may be occluded by the linemen 518, but may have an LOS to the Full-Back (FB), the Half-Back (HB), the Wide-Receiver (WR), or to any other player, referee, or support people in range. Therefore, according to this invention, the occluded QB player's location may be restored using its distance to the FB, HB, WR, and/or other players with known locations. Another example is resolving the identifications and positions of the linemen 518 players. The linemen players are positioned in tight proximity along the scrimmage line 516, and, therefore, might not be separable and/or identifiable by vision-based methods alone. However, their formation along the scrimmage line (as dictated by the rules of the game) provides a constraint that together with the PDFs derived by one reader is sufficient to determine these players' location. For instance, six-player linemen results in six ring-form PDFs, each centered at the reader's position and with a radius equal to the distance between the reader and the corresponding player. The intersections between these rings and the linemen formation results in the position of each one of the players. The linemen formation, in turn, may be detected by vision-based methods.

These methods, as applied for identification and tracking of football players in embodiments described herein, present an opportunity for higher level analyses of parameters such as team formation, play classification, etc. These methods may also allow for monitoring each team's 11 active players and may allow indicating who out of the 53 available players in each team is now playing on the field. This may be done by either tracking the total 106 football players continuously, or by activating the tracking only for those players who are on the field while deactivating the tracking for the other players who are currently off the field. In some cases, there may be a situation in which not all players are tagged. In this case, identification and tracking of untagged players may be done by vision-based methods and methods where a game's formation and rules are used to deduct the likely position and identity of untagged-players.

The method in the embodiment described above is especially useful in tracking small objects such as a ball in a basketball game that is often occluded by some players and is hard to detect and track using vision alone. It is also applicable to resolving self-occlusion when detecting and tracking the pose of an articulated object as demonstrated in FIG. 6.

Figure 6:
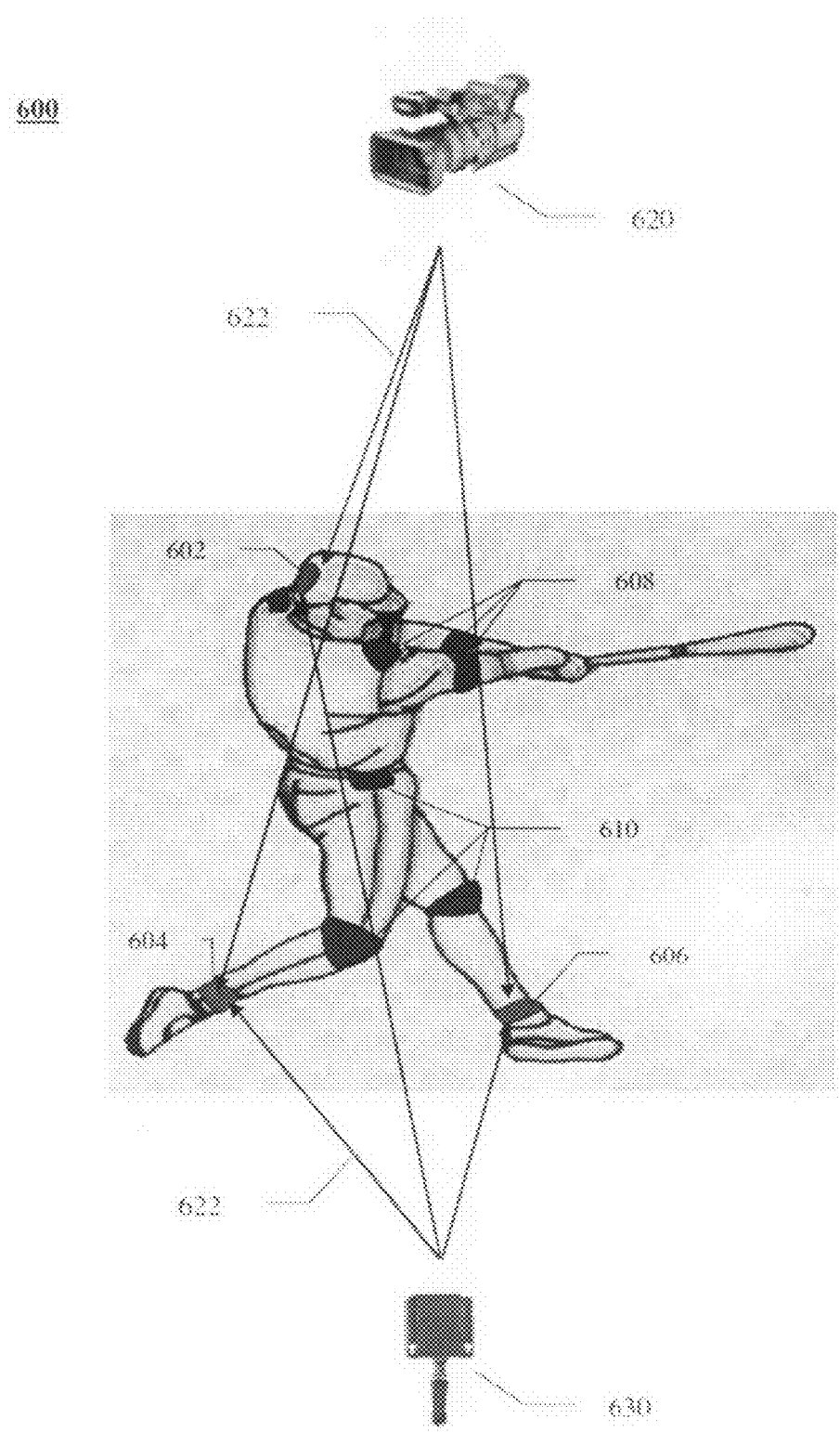
FIG. 6 illustrates pose detection and tracking using transponders attached to an object's joints according to an embodiment.

FIG. 6 shows an example embodiment where the motion of an articulated object—a baseball batter, for example—is calculated by means of tracking the object's joints. In this case, self-occlusion complicates vision-based tracking. Here too, RTLS technology may be utilized to supplement the shortcoming of vision-based technology. In FIG. 6 transponders 602-610 are attached to the joints of a baseball batter to allow pose detection and tracking. While the extremities of a human (top of the head 602 and ankles 604-606, for example) are with LOS 622 to the camera 620 and the reader 630, and, therefore, relatively straightforward to detect and track (for example, known in the art head detection methods), other locations (such as knees, elbows, shoulders 608-610) may be 1) self-occluded relative to the camera and reader or 2) hard to extract with vision-based techniques. In this case, for example, each transponder, 602, 604, and 606, measures telemetry relative to all other transponders that are with LOS to it, 608-610, and transmits these data to the reader together with telemetry relative to its own distance to the reader. In this embodiment, an RTLS technology that is better suited for short-range and with small granularity may be used for communication among the transponders 602-610, while another RTLS technology that is better suited for long-range telemetry may be used for communication between the transponders 604-606 and the readers.

Figure 7:
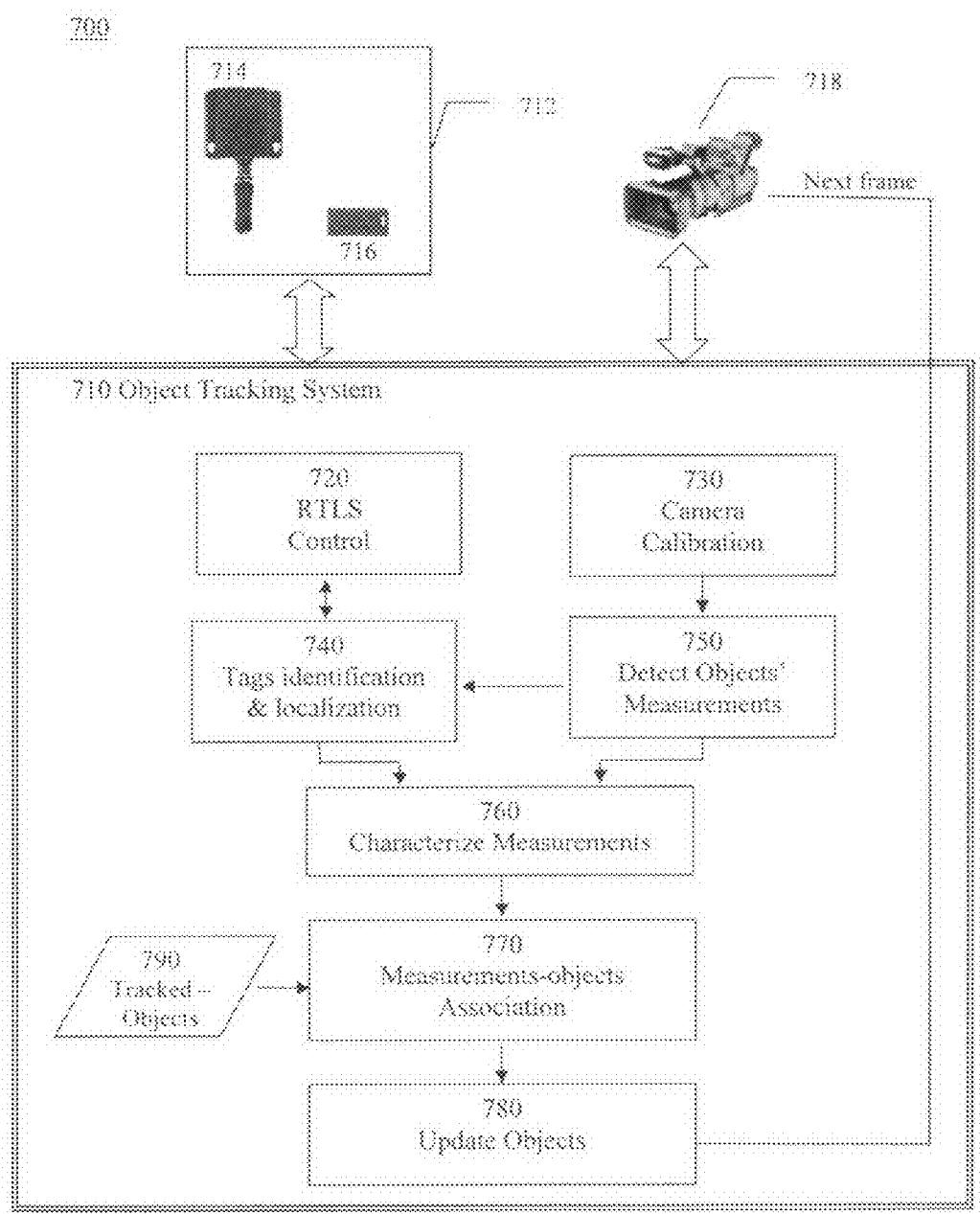
FIG. 7 illustrates a block diagram of a synergetic tracking system according to an embodiment.

FIG. 7 shows a mobile system for tracking dynamic objects according to an embodiment. In this system at least one camera 718 is set to cover the scene; this may be a stationary or a non-stationary camera, such as a broadcast camera. The camera video frames are fed into the object tracking system 710 for processing, one frame at a time. In addition, an RTLS subsystem 712 is integrated into the system, including at least one reader 714 and a combination of passive, semi-passive, and/or active transponders 716. Transponders may have environmental sensors attached to them to measure variables including temperature, motion, and impact energy. Both the video camera and the RTLS subsystem communicate with the object tracking system 710, locally or remotely, through wire or wireless, or by using any other means of communication. The object tracking system 710 receives data from the RTLS subsystem 712 and the camera 718, as well as manages and controls them.

Depending on the camera, calibration 730 may be carried out once at system resetting time (static camera), or may be done on-the-fly during system operation (dynamic camera), according to some embodiments. Known calibration methods estimate the camera model by, for instance, matching landmarks in the scene's real world model and their corresponding points in the scene's projected image. Having the camera model, one can map image space coordinate to real world coordinates and vice versa.

The detection of each object's projected image—referred to as the object's measurement—via processing of the current, and possibly the previous video frames, is done next 750. Known methods for background subtraction generate a mask that outlines the foreground regions in the current video frame. These blobs (foreground regions) segment out the projected image of the players (moving objects) or cluster of players. Hence, a measurement may include information derived from pixels belonging to an object or to objects' projective image. In the case where an object is isolated (a foreground region contains an image of one object only), accurate modeling and positioning of the object on the ground can be derived. On the other extreme, it is a challenge to model and position an object when it is submerged in a cluster of other objects. Thus, the positional data of isolated objects (together with other related data such as time-step and velocity) sent to process 740 may be utilized in the process of identification and localization of tagged objects, as demonstrated in FIG. 4. This will be explained further below.

Process 720 resets and controls the RTLS subsystem 712. This process also collects the telemetry measured by the RTLS subsystem. Depending on the RTLS technology in use, the telemetry may be Time of Arrival (TOA), Angle of Arrival (AOA), Received Signal Strength Indicator (RSSI), etc. This telemetry provided by the RTLS subsystem may be generated periodically or on demand.

Next, in step 740, the distances between the reader 714 and the transponders 716, and the distances among the transponders (with the exception of when there is no LOS) are calculated. Next, the location of each identified tagged-player is derived using 1) all the available distances between this tagged-player and other tagged-players/reader and 2) the positions of the other tagged-players/reader as given by step 750. As mentioned above, RTLS-based position estimates may be represented by a spatial likelihood function—PDF. The more reader/transponders with known locations and corresponding distances to the given object are available for the positioning method, the smaller the entropy of the corresponding PDF (meaning a smaller uncertainty region).

The players' identification and corresponding PDFs are now used in step 760 to characterize the measurements. For instance, an image (measurement) of a cluster of players may now be segmented into sub-regions where each sub-region corresponds to one player in the cluster. This may be accomplished with a probabilistic clustering method using the given PDFs as prior information.

Next, in step 770, these characterized measurements are associated with the current list of tracked objects 790. Finally, the tracking data of each tracked object—position, velocity, identity, etc.—is updated in step 780 using known tracking methods, such as those described in U.S. patent application Ser. No. 12/403,857 by Gefen.

The fusion of vision-based and RTLS-based data, as described above, may be achieved through processing of video frames received from the camera and telemetry received from the RTLS, according to embodiments. Typically, the data transfer rate of RTLS is not the same as the camera frame rate. An RTLS that uses a high frequency carrier signal attains a high data rate. This, in turn, allows the system to accommodate a large number of transponders and allows each transponder to transmit larger data packets; the higher the frequency, the faster the communication among readers and transponders. However, a high frequency carrier signal attenuates faster, and, therefore, its range is more limited.

In embodiments where multiple transponders and readers are involved, depending on the RTLS specific technology, RTLS generated telemetry may lag the corresponding vision-based tracking data. This potential latency may extend to several video frames and requires a synchronization mechanism, for example, attaching a timestamp to both vision-based and RTLS-based data that may later be used for synchronization. Therefore, where RTLS data transmission throughput is lower than camera frame rate, telemetry may be available to the Object Tracking System 710 only every N video frames. Hence, in this case, vision based tracking data interpolate the missing data points where tracking data derived from telemetry is not available. Alternatively, the RTLS 712 may send telemetry to the Object Tracking System 710 only when ordered to do so by the RTLS Control 720 unit. In this case, RTLS-based identification and location data will be ordered, for example, only when required to resolve occlusion.

An exemplary embodiment of the RTLS subsystem 712 is described next, applying Ultrawide-band (UWB) communication technology. A UWB carrier-less communication signal is defined as a signal with a bandwidth of at least 500 MHz or with a bandwidth of at least 20% of the central frequency. In 2002 the Federal Communication Commission (FCC) approved transmission of a UWB communication signal in a range of 3.1 GHz to 10.6 GHz, and at a spectral density under −41.3 dBm/MHz. The UWB signal exhibits excellent performance in a highly reflective environment (multi-path) owing to a low duty-cycle pulse. In addition, interference with other RF signals is minimal due to non-overlapping frequency bandwidths and the difference in signal type. Consequently, UWB became an attractive solution for applications where high data-rate and high resolution are required. Recent developments feature UWB-based RTLS with below-1 ft locating accuracy and an update rate of several milliseconds. Yet, LOS to the target is still a requirement in order to allow real-time localization.

Figure 8:
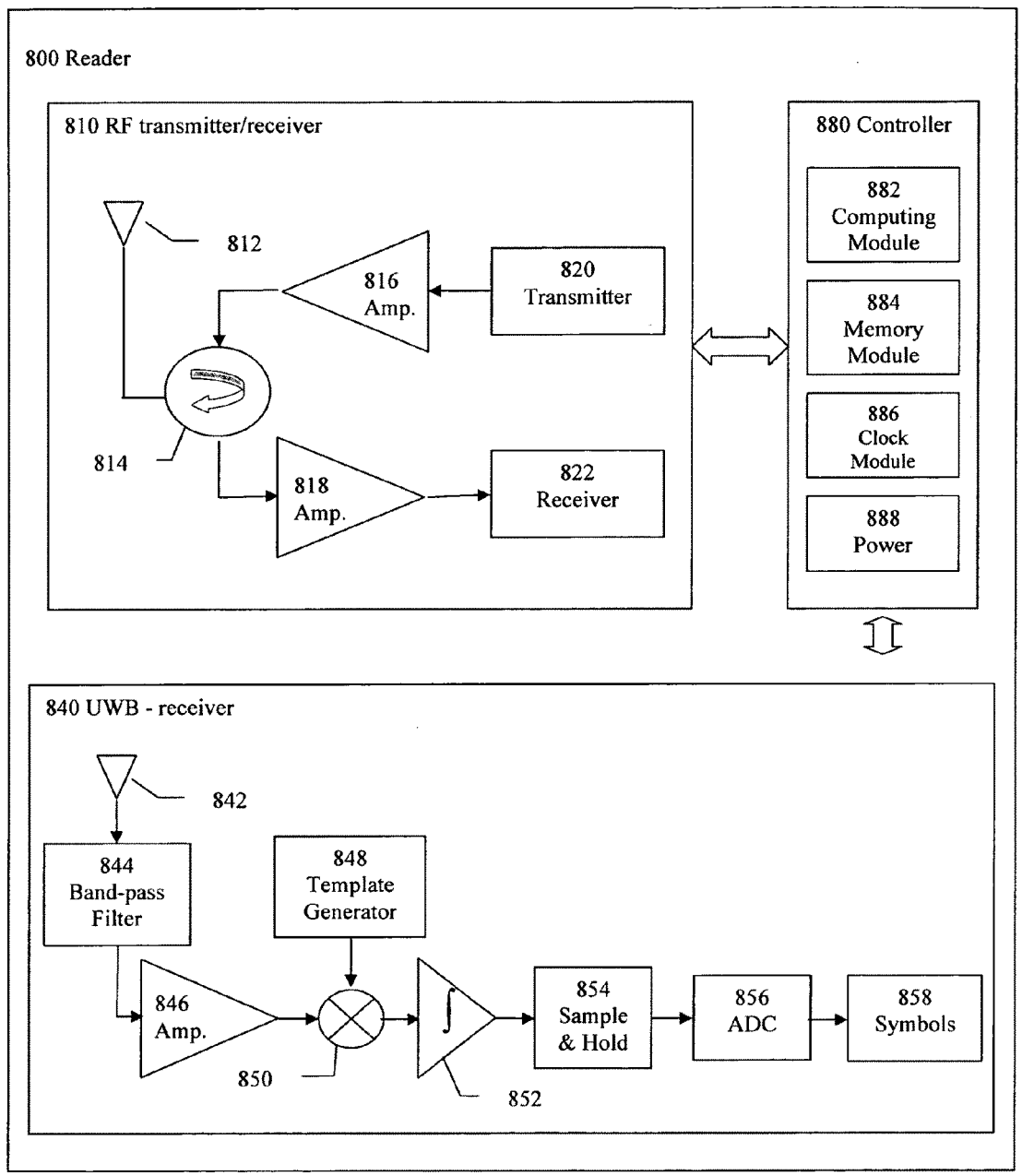
FIG. 8 illustrates an exemplary real time locating system (RTLS) reader according to an embodiment.

FIG. 8 shows the reader 800 component of the UWB-based RTLS, according to an embodiment. The reader may consist of a traditional (carrier-based) RF transmitter/receiver unit 810, a UWB receiver unit 840, and a controller 880. The RF communication unit may receive and transmit modulated signals through its antenna 812. A circulator 814 may direct the incoming signals from the antenna to the receiver's amplifier 818, while preventing such signals from passing through the transmitter's amplifier 816. Similarly, outgoing signals from the transmitter may be directed out to the antenna, while being prevented from passing through the receiver's amplifier. Triggered by the controller 880, the transmitter 820 and the receiver 822 may carry out the communication between the reader and the tags. A main purpose of this communication may be to control the tags' operation and, possibly, receive the tags' sensory data.

The UWB receiver 840 may receive the UWB signal from which ranging data are derived through an antenna 842. The UWB signal may be first filtered 844 and then amplified 846. The amplified signal may then be mixed 850 with a template signal generated by the template generator 848. The template signal may be based on the impulse waveform employed in the system and designed to extract the impulse from the received UWB signal through correlation achieved by mixing 850 and integrating 852. The analog signal from the integrator may then be passed to a sample and hold circuit 854 where a certain signal level is selected and further converted into digital data by the ADC 856. These digital data are translated into digital symbols 858 that are further processed by the reader's controller 880 where derivations of telemetry such as TOA and AOA take place.

The reader's controller 880 may include a computing module 882, a memory module 884, a clock module 886, and a power source 888, according to an embodiment. The reader's controller manages communication between the reader and the tags, and possibly other readers. It may collect sensory and status data from the tags (via its RF communication unit) and the tags' ranging data (via its UWB receiver). The reader's controller 880 may compute the distances and angles between the reader and the tags, as well as the distances among tags, and pass these measures to the RTLS controller 720 for further processing.

Figure 9:
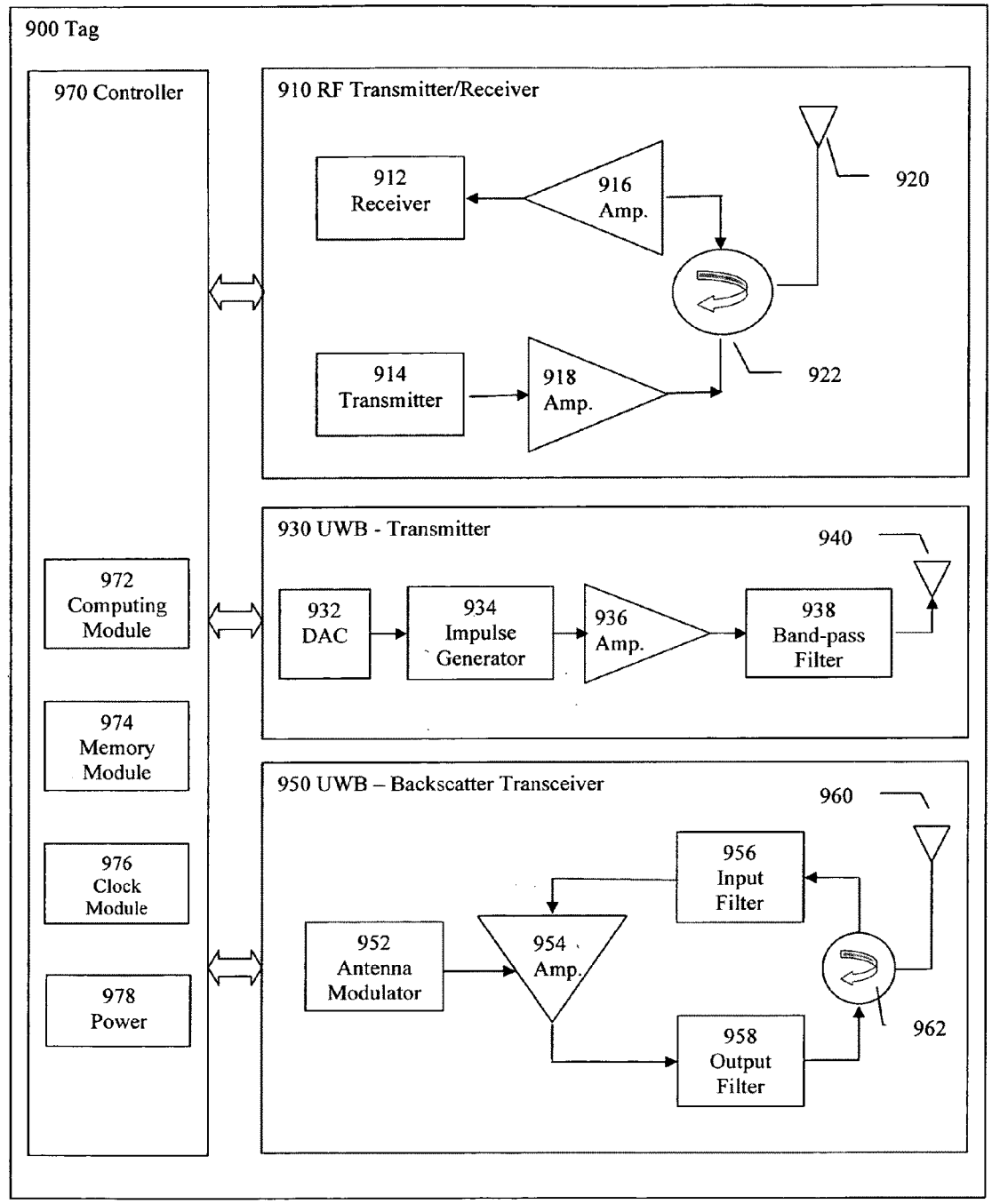
FIG. 9 illustrates an exemplary RTLS tag according to an embodiment.

FIG. 9 shows the tag component of the UWB-based RTLS 900, according to an embodiment. The tag may consist of a traditional (carrier-based) RF transceiver/receiver unit 910, a UWB transmitter unit 930, a UWB backscatter transceiver 950, and a control unit 970. Similarly to the reader's, the tag's RF transmitter/receiver 910 may include an antenna 920, a circulator 922, amplifiers 916 and 918, a receiver 912, and a transmitter 914. Through this RF communication unit, the tag operation mode may be set up by the reader and various sensory and status data may be sent from the tag to the reader. The UWB-transmitter 930 may send UWB signals when triggered by the controller 970. Hence, the transmitter may receive an interrogation sequence from the controller and convert it into an analog signal using the DAC 932 from which UWB pulses are generated by the Impulse Generator 934. The UWB signal may then be amplified 936 and filtered 938 before being transmitted through the antenna 940.

In contrast to the UWB-transmitter 930, the UWB-backscatter transceiver 950 may merely respond to a received UWB signal. Insulation between incoming and backscattered UWB signals may be provided by the circulator 962. An incoming UWB signal may be reflected back or absorbed by the antenna 960 depending on the antenna's properties. The antenna modulator 952 is designed to configure the antenna, for example by controlling the antenna's impedance. Thus, information may be encoded by, for example, reflecting, absorbing and/or changing the polarity of the incoming signal. In addition, the modulator 952 may control the amplifier's 954 signal response. Transceiver 950 may also include an output filter 958 and an input filter 956.

The tag's controller 970 is a processing model, including a computing module 972, a memory module 974, a clock 976, and a power source 978. The tag's identification data and possibly the tag's sensory data may be analyzed and stored in the controller. The clock module controls the timing in which the UWB signal transmission 930 takes place and the timing that the antenna modulator changes the antenna's impedance and thereby encodes data such as the tag's ID into the back-scattered UWB signal.

As depicted in FIG. 4, an RTLS system may include at least one reader and a plurality of tags attached to targets of interest. At any time some of the tags may have a direct LOS to the reader and some have merely indirect LOS to the reader (meaning an LOS that passes through another tag with a direct LOS to the reader). Hence, the system, according to an embodiment, locates both tags with direct LOS and tags with indirect LOS as follows.

The reader 800 may allocate a time slot to a tag 900. Throughout this time slot this specific tag is set to operate in a master operation mode, while all the other tags are set to operate in a slave operation mode, according to an embodiment. When a tag is in a master operation mode it may be configured to transmit 930 a UWB signal—a sequence of very short pulses. This signal, denoted by $S_0(t)$, may be received by a reader's UWB receiver 840 if a direct LOS exists. It may also be received and backscattered by another slave-tag's UWB backscatter transceiver 950 that is with an LOS to the master-tag. Such a backscattered signal from a slave-tag, denoted by $S_i(t)$ (i denotes a slave-tag index), is sent back to the master-tag's UWB backscatter transceiver 950 where it is then backscattered to the reader. Note that, first, UWB signal transmission by a tag's UWB transmitter 930 may occur in this case only when the tag is set to operate in a master operation mode; and, second, that all tags (master and slave) backscatter a signal where the master-tag is configured to only backscatter the $S_i(t)$ signals and all other slave-tags are configured to only backscatter the $S_0(t)$ signal.

Figure 10:
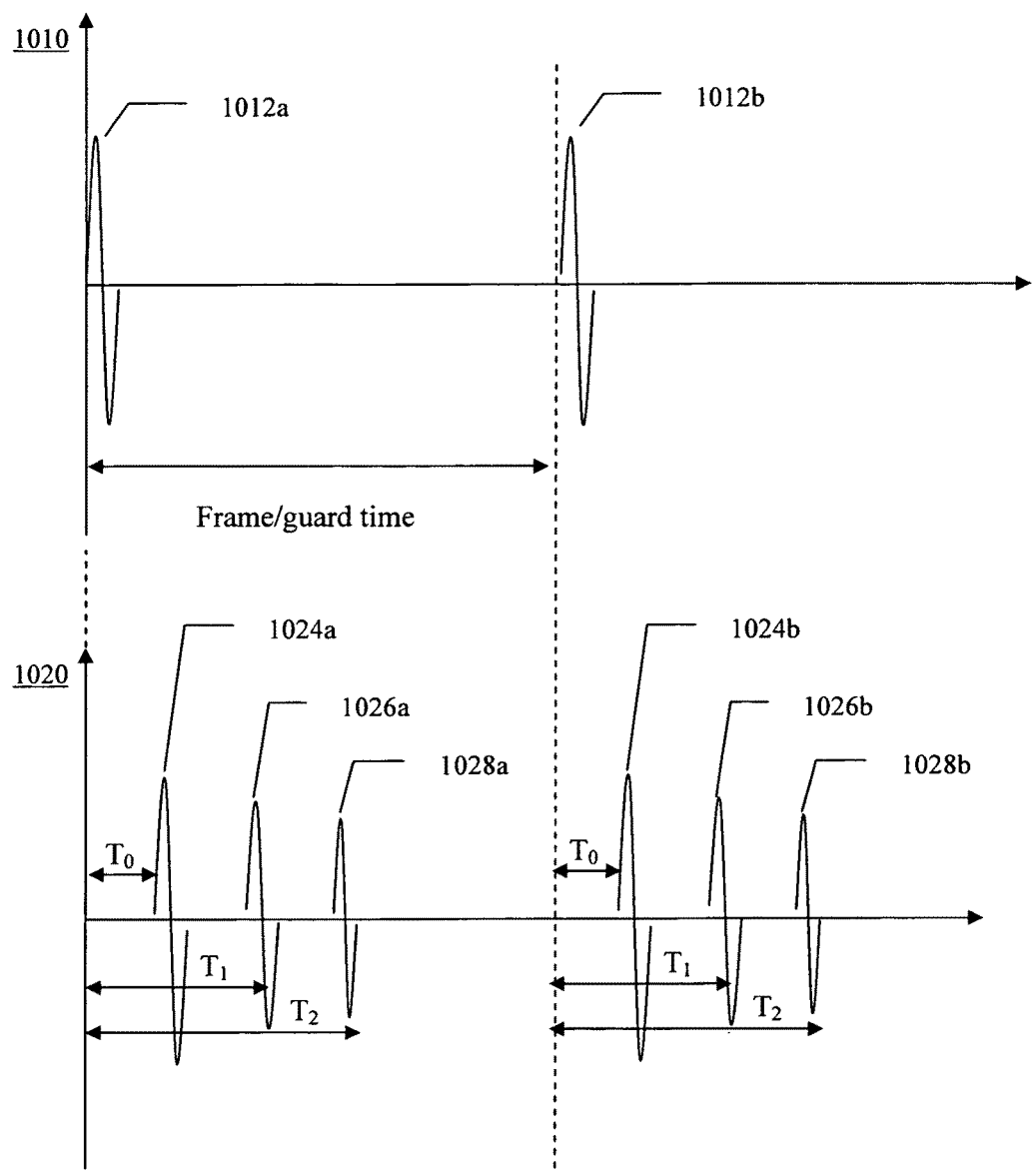
FIG. 10 illustrates an exemplary RTLS timing diagram according to an embodiment.

FIG. 10 demonstrates the progression of the UWB signals as transmitted by the master-tag 1010 and as received by the reader 1020, according to an embodiment. The tag set to be in a master operation mode may send periodic UWB pulses: 1012a, 1012b, etc., separated by a "guard time". The guard time may prevent interference between backscattered signals resulting from successive pulses. At the reader 800, first, the $S_0(t)$ signal is received: 1024a, 1024b, etc., with a delay time of $T_0$. Then a backscattered signal from one slave-tag, $S_1(t)$, may be received: 1026a, 1026b, etc., with a delay time of $T_1$. Similarly, a backscattered signal from a second slave-tag, $S_2(t)$, may be received: 1028a, 1028b, etc., with a delay time of $T_2$. Note that while $T_0$ represents the time it took $S_0(t)$ to travel from the mater-tag to the reader, $T_i$ represents the time it took $S_i(t)$ to travel from the slave-tag i, through the master-tag, to the reader.

These signal progression times (TOA) together with the knowledge of signal progression speed may be used by the reader 800 to calculate the distance between the reader to the master-tag and the distances between the master-tag and the slave-tags, according to a further embodiment. The reader 800 may be configured to measure in addition to signal progression time also the master-tags signal angle of arrival (AOA) and other telemetry that could be instrumental in calculating tags location (RSSI, TDOA, TOF, RTT, etc.).

Figure 11:
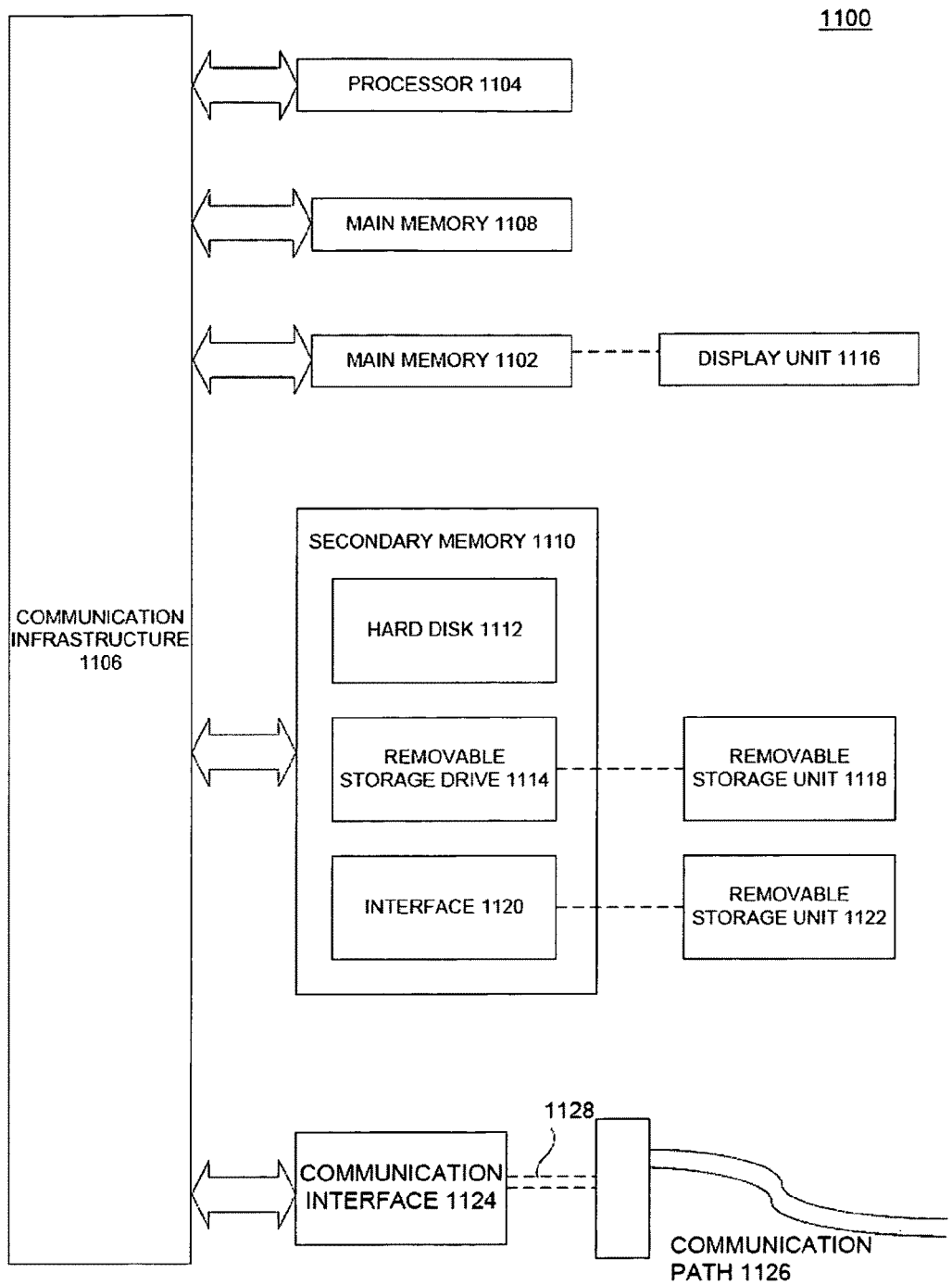
FIG. 11 illustrates an example computing device which may be used in embodiments of this invention.

Aspects described above, for the exemplary embodiments shown in FIGS. 1-10 or any part(s) or function(s) thereof may be implemented using hardware, software modules, firmware, tangible computer readable or computer usable storage media having instructions stored thereon, or a combination thereof and may be implemented in one or more computer systems or other processing systems. FIG. 11 illustrates an example computer system 1100 in which embodiments of the present invention, or portions thereof, can be implemented as computer-readable code. For example, object tracking system 140, visual information receiver 160, RTLS information receiver 170, object tracker 180 and/or any other components of the exemplary systems shown in FIGS. 1-10 can be implemented in hardware, firmware, or as computer-readable code on a computer system such as computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general purpose processor. Processor 1104 is connected to a communication infrastructure 1106 (for example, a bus or network).

Computer system 1100 also includes one or more main memories 1102 and 1108, preferably random access memory (RAM), and may also include a display unit 1116 and a secondary memory 1110. Secondary memory 1110 may include, for example, a hard disk drive 1112 and/or a removable storage drive 1114. Removable storage drive 1114 may comprise a floppy disk drive, a magnetic tape drive, an optical disk drive, a flash memory, or the like. The removable storage drive 1114 reads from and/or writes to a removable storage unit 1118 in a well known manner. Removable storage unit 1118 may comprise a floppy disk, magnetic tape, optical disk, etc. which is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, a wireless card, or the like. Software and data transferred via communications interface 1124 are in the form of signals 1128 which may be electronic, electromagnetic, optical, or other signals capable of being received by communications interface 1124. These signals 1128 are provided to communications interface 1124 via a communications path 1126. Communications path 1126 carries signals 1128 and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, a hard disk installed in hard disk drive 1112, and signals carried over communications path 1126. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the methods described above. Accordingly, such computer programs represent controllers of the computer system 1100. Where the invention is implemented using software, the software may be stored in a computer program product and loaded into computer system 1100 using removable storage drive 1114, interface 1120, hard drive 1112 or communications interface 1124.

Embodiments of the invention also may be directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for tracking objects in a scene comprising:
   receiving visual-based information of the scene with a vision-based tracking system;
   receiving telemetry-based information of the scene with a real time locating system (RTLS)-based tracking system; and
   when each of the visual-based tracking system and the RTLS-based tracking system cannot independently identify a location and an identity of a first object in the scene, determining the location and the identity of the first object in the scene by fusing the visual-based information with the telemetry-based information independent of a past trajectory of the first object.

2. The method of claim 1, wherein the determining further comprises using a spatial likelihood function to compute the location and identity of the first object in the scene.

3. The method of claim 1, further comprising:
determining when no direct line of sight (LOS) is available between the first object and a camera of the vision-based tracking system; and
determining what telemetry-based information from the RTLS-based tracking system to use to locate and identify the first object.

4. The method of claim 1, further comprising:
determining when no direct line of sight (LOS) is available between an RTLS tag situated on the first object and a reader of the RTLS-based tracking system; and
determining what visual-based information to use to locate and identify the first object.

5. The method of claim 1, further comprising:
segmenting out an image measurement of the first object based on the location and identity of the first object;
characterizing the first object based on the first object's image measurement; and
associating the characteristic data of the first object with tracking information corresponding to the first object.

6. The method of claim 1, wherein the visual-based information includes the location of the first object and the telemetry-based information includes the identity of the first object.

7. The method of claim 1, wherein the telemetry-based information includes the location of the first object and the visual-based information includes the identity of the first object.

8. The method of claim 1, wherein the using telemetry-based information includes using telemetry-based information only when necessary to resolve the location and identity of the first object when one or more lines of sight (LOS) between the first object and a camera of the visual-based tracking system are impeded.

9. The method of claim 1, wherein the using visual-based information includes using visual-based information only when necessary to resolve the location and identity of the first object when one or more lines of sight (LOS) between a first RTLS tag on the first object and a reader of the RTLS-based tracking system are impeded.

10. The method of claim 1, further comprising:
activating a first RTLS tag situated on the first object when the first object is inside a specified area of the scene; and
deactivating the first RTLS tag situated on the first object when the first object is outside a specified area of the scene.

11. The method of claim 1, wherein the determining further comprises using spatial constraints to compute the location and identity of the first object in the scene.

12. The method of claim 1, wherein the telemetry-based information includes distance measurements between at least the first object and a second object of a plurality of objects in the scene.

13. The method of claim 12, further comprising:
transmitting a first signal from a first RTLS tag situated on the first object to a second RTLS tag situated on the second object and to a reader of the RTLS-based tracking system; and
transmitting a second signal from the second RTLS tag situated on the second object through the first RTLS tag to the reader of the RTLS-based tracking system.

14. The method of claim 12, further comprising locating and identifying the first and second objects when the first and second objects are located on different parts of a larger object.

15. A computer-implemented method for tracking objects in a scene comprising:
detecting a location and an identity of a first object using a visual-based tracking system;
determining a first telemetry-based distance measurement between the first object and a second object using a real time locating system (RTLS)-based tracking system; and
when each of the visual-based tracking system and the RTLS-based tracking system cannot independently identify a location and an identity of the second object, determining the location and the identity of the second object by fusing the detected location of the first object with the first determined distance measurement independent of a past trajectory of the second object.

16. A system for tracking objects in a scene comprising:
a visual-based information receiver receiving configured to receive visual information of the scene with a vision-based tracking system;
a telemetry-based information receiver configured to receive telemetry-based information of the scene with an RTLS-based tracking system; and
an object tracker, implemented on a processor-based system, configured to locate and identify a first object in the scene by fusing the visual-based information with the telemetry-based information when each of the visual-based tracking system and the RTLS-based tracking system cannot independently identify a location and an identity of the first object, wherein the fusing is independent of a past trajectory of the first object.

17. The system of claim 16, wherein the object tracker is further configured to use a spatial likelihood function to compute the location and identity of the first object in the scene.

18. The system of claim 16, wherein the object tracker is further configured to:
determine when no direct line of sight (LOS) is available between the first object and a camera of the vision-based tracking system; and
determine what telemetry-based information from the RTLS-based tracking system to use to locate and identify the first object.

19. The system of claim 16, wherein the object tracker is further configured to:
determine when no direct line of sight (LOS) is available between an RTLS tag situated on the first object and a reader of the RTLS-based tracking system; and
determine what visual-based information to use to locate and identify the first object.

20. The system of claim 16, wherein the visual-based information includes a location of the first object and the telemetry-based information includes the identity of the first object.

21. The system of claim 16, wherein the telemetry-based information includes a location of the first object and the visual-based information includes the identity of the first object.

22. The system of claim 16, wherein the object tracker is further configured to:
segment out an image measurement of the first object based on the location and identity of the first object;
characterize the first object based on the first object's image measurement; and
associate the characteristic data of the first object with tracking information corresponding to the first object.

23. The system of claim 16, wherein the determining further comprises using spatial constraints to compute the location and identity of the first object in the scene.

24. The system of claim 16, wherein the telemetry-based information includes distance measurements between at least the first object and a second object of a plurality of objects in the scene.

25. The system of claim 24, wherein the telemetry-based information receiver is further configured to receive a first signal from a first RTLS tag situated on the first object and a second signal from a second RTLS tag situated on the second object, wherein the second signal is transmitted through the first RTLS tag.

26. A system for tracking objects in a scene comprising:
a visual-based tracking component, implemented by a processor, detecting a location of a first object;
a real time locating system (RTLS)-based tracking component, implemented by the processor, determining a first distance measurement between the first object and a reader of the RTLS-based tracking system, and determining a second distance measurement between the first object and a second object; and
an object tracker component, implemented by the processor, determining a location and an identity of the second object by fusing the detected location of the first object with the first and second determined distance measurements when each of the visual-based tracking component and the RTLS-based tracking component cannot independently identify the location and the identity of the second object, wherein the fusing is independent of a past trajectory of the first object.

27. The system of claim 26, wherein the RTLS-based tracking component comprises a first RTLS tag situated on the first object, configured to transmit a first signal to a second RTLS tag situated on the second object and to the reader of the RTLS-based tracking component having information associated with the first object.

28. The system of claim 26, wherein the RTLS-based tracking component comprises a second RTLS tag situated on the second object, configured to transmit a second signal through a first RTLS tag situated on the first object to the reader of the RTLS-based tracking component having information associated with the second object.

* * * * *